United States Patent

Hilbert

[15] 3,660,586

[45] May 2, 1972

[54] TEACHING AND TESTING APPARATUS

[72] Inventor: Bertram J. Hilbert, 1826 Chew St., Allentown, Pa. 18104

[22] Filed: Aug. 3, 1970

[21] Appl. No.: 60,344

[52] U.S. Cl. ............................................................. 35/48 R
[51] Int. Cl. ....................................................... G09b 5/00
[58] Field of Search .................... 35/14, 22 R, 48 R, 9 R, 9 B; 235/103; 273/1 E

[56] References Cited

UNITED STATES PATENTS 2,923,069  2/1960  Nachem........................................35/14
3,225,460  12/1965  Randell et al. ..........................35/22 R
2,586,234  2/1952  Kopas................................35/48 R X Primary Examiner—Wm. H. Grieb
Attorney—Michael J. Delaney

[57] ABSTRACT

Apparatus for aiding in teaching and/or testing wherein means is provided for operation by the instructor for rewarding or penalizing for a correct or incorrect response, respectively, and counting said responses simultaneously with said reward or penalty and having means for bypassing the counting means.

6 Claims, 4 Drawing Figures

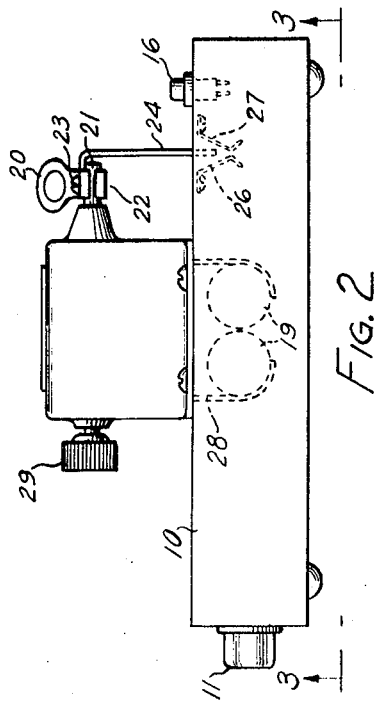
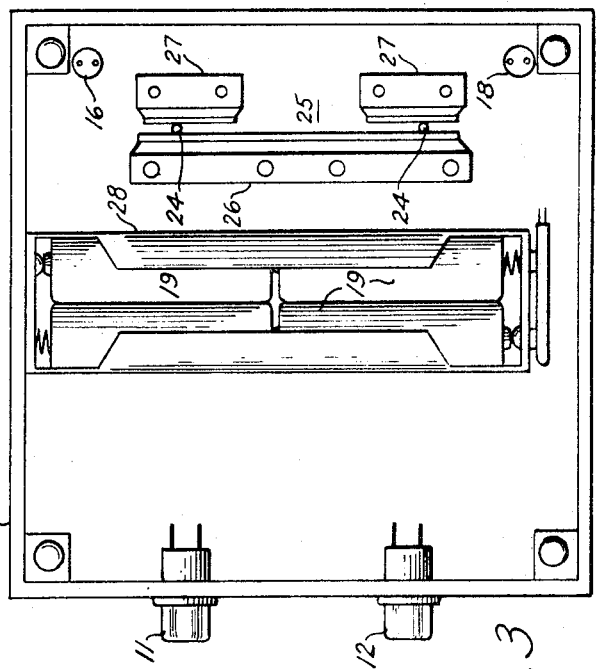
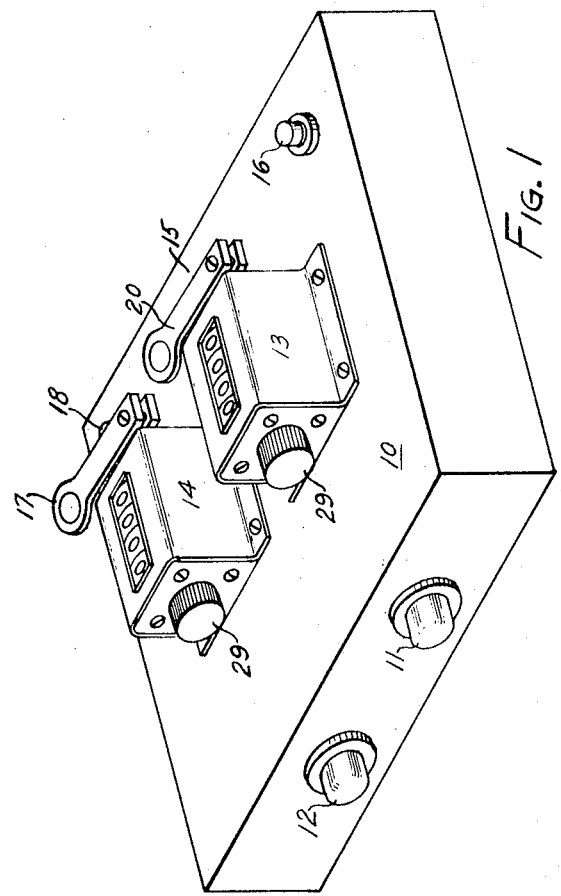
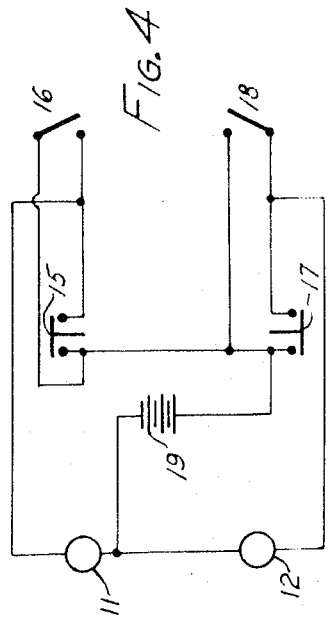
INVENTOR
Bertram J. Hilbert

TEACHING AND TESTING APPARATUS

BACKGROUND OF THE INVENTION

The value of mechanical devices as aids in teaching has long been recognized and the use of various devices is widespread in the teaching profession. The psychological factors involved which can be advantageous include the positive effects of some reward for effort resulting from a correct response and the lasting impression a penalty resulting from an incorrect response has in effecting a teaching process. The value of rewards and penalties in the form of visual or audible signals in such fields as speech therapy, for example, is well recognized. Devices are known which have signal lights and/or bells for indicating correct or incorrect responses including means for counting the responses. These known devices are cumbersome and not easily transportable. Furthermore, it is sometimes desirable to instruct the pupil on the operation of the device before and during use in a teaching process and such use requires the resetting of the counters on the prior art devices.

It is, therefore, a principal object of the instant invention to provide a portable teaching device to aid in a teaching and/or testing process.

It is a further object of the invention to provide a device that simultaneously and instantly rewards the response and counts the responses.

It is another object to provide means to override the counter means during periods of instruction on the use of the device.

It is still another object of the invention to provide means for objective evaluation of pupil progress.

SUMMARY OF THE INVENTION

The instant invention accomplishes these objects by providing apparatus which is adapted to simultaneously indicate by signal means a correct or incorrect response and to record the response on a counter which is adapted to give the instructor a visual means for evaluating the pupil's progress at any time during the teaching or testing period.

BRIEF DESCRIPTION OF THE DRAWINGS

FIG. 1 is a view in perspective of the apparatus of the instant invention;

FIG. 2 is a side view of the apparatus;

FIG. 3 is a bottom view of the apparatus taken of line 3—3 of FIG. 2; and

FIG. 4 is a wiring diagram.

DESCRIPTION OF THE PREFERRED EMBODIMENT

Referring now to the drawings for a detailed description of the invention the apparatus is seen to comprise generally a housing 10, signal lights 11 and 12, counter means 13 and 14, switch means 15 and 16, switch means 17 and 18 and battery packs 19. Housing 10 is fabricated from any of the well known materials used for small portable packages, e.g., molded plastic or plywood and is adapted to have the aforementioned elements attached thereto. Electrical circuits to be described in more detail later connect the lights, counter means and switches.

Signal lights 11 and 12 are connected into the circuit with light 11 preferably being colored green to indicate a correct response and light 12 being colored red to indicate an incorrect response. It is clear that a variety of visual or audible signals could be substituted for the red and green lights as desired by the operator, e.g., signal flags actuated by solenoids inserted in the circuit in place of said lights.

A battery pack 19 or energy source is supplied having sufficient capacity to provide power to energize the signals used, such as lights 11 or 12 in the instant invention. The battery pack 19 is connected into the circuit as seen in FIG. 4 and is attached to the housing in bracket means 28. Digital counter means 13 and 14 mounted on the housing as seen in FIGS. 1 and 2 adapted to be actuated by switch means 15 and 17 respectively as will be described in detail.

A first normally open switch means 15 is provided which when actuated will complete an electrical circuit to energize the light means 11. Switch means 15 is operatively connected to digital counter means 13 as will presently be understood to simultaneously and instantly actuate said counter. The switch 15 comprises a lever 20 which is attached to shaft extension 21 of the counter 13 by any convenient means, as e.g., a clevis 22 and set screw 23 shown. Also attached to the lever 20 and spaced from the shaft extension 21 is a contact bar 24 extending downwardly from the lever at substantially right angles thereto. Conductor bar assembly 25, comprising conductor elements 26 and 27 are mounted on the underside of the top of housing 10. An aperture or slot (not shown) is provided for the contact bar 24 to freely operate to close or open the switch 15 as desired. Elements 26 and 27 are spaced from but biased toward each other to form an open contact which is closed when the switch lever 20 is depressed to energize the circuit including signal means 11.

A second normally open switch 16 is provided as shown in the Figures adapted to bypass the counter means 13. Switch 16 is a push button "two point make" type switch and when depressed will close the circuit to energize the signal means 11 bypassing the counter 13 which can only be mechanically actuated through switch 15.

The apparatus described hereabove constitutes a first electrical circuit. A second electrical circuit comprising similar elements, viz., a third normally open switch means 17, fourth normally open switch means 18, counter 14, signal means 12 and corresponding conductor means is also shown in the preferred embodiment. It will be understood by those skilled in the art that the invention herein described can be adapted to a plurality of signal units or single signal unit without departing from the spirit or scope of the invention.

Except as specifically described above the conductor means between the various elements of the electrical circuits comprise wire of convenient size capable of supplying energy to the circuit.

In operation: The device of the instant invention, which because of its compactness is conveniently portable, is placed between the instructor and pupil with the signal lights facing the pupil. The pupil responds to a question or directive by the instructor and the instructor depresses either the switch which lights the green light indicating a correct response or the red light to indicate an incorrect response. Simultaneously and instantly, because of the operative connection between switch 15 and counter 13 or switch 17 and counter 14, the answer is recorded on the counter. Subsequent responses are likewise recorded and the instructor has a running account of the pupil's progress readily available. At the conclusion of the teaching or testing session the instructor can transfer the readings from the counters onto a permanent record and reset the counters by means of reset wheels 29.

Prior to a session with a pupil and in preparation therefor the instructor will want to brief the pupil on the operation of the device. In order to avoid delays in resetting the counters and possibly loss of attention of the pupil the instant invention provides a bypass means by which the instructor can depress either of the switches 16 and 18 to indicate a green light or red light overriding the counter means. The device is thus ready for immediate use.

The instructor may find it necessary or advantageous to review with the pupil the procedure of rewarding a green light for a correct response or a red light for an incorrect response during a testing session. The overriding feature built-in to this device permits him to perform this review including energizing the lights as desired without actuating the counters. The testing can proceed once again with no adjustment of the counters.

The Applicant has thus provided a unique and useful device for the teaching or testing or tutoring of pupils in a variety of fields of education as, e.g., speech therapy as suggested hereinbefore. The device offers a more objective evaluation of pupil progress and presents to psychologists an aid to behavior modification.

I claim:

1. Teaching and testing apparatus comprising:
    a housing,
    a first and second electrical circuit mounted in said housing,
    first signal means mounted on said housing in said first and second circuits,
    first counter means mounted on said housing,
    first switch means connected to said first counter means to close said first circuit and actuate said first counter means and said first signal means, and
    second switch means to close said second circuit and actuate said first signal means.

2. Teaching and testing apparatus according to claim 1 including:
    third and fourth electrical circuits mounted in said housing,
    second signal means mounted on said housing in said third and fourth circuits,
    second counter means mounted on said housing,
    third switch means connected to said second counter means to close said third circuit to actuate said second signal means and said second counter means, and
    fourth switch means to close said fourth circuit to actuate said second signal means.

3. Apparatus according to claim 2 wherein said first and third switches comprise manually operable levers which are operatively connected respectively to said first counter means and said first signal means, and said second counter means and said second signal means.

4. Apparatus according to claim 2 wherein
    said first signal means comprises a first indicator and said second signal means comprises a second indicator.

5. Apparatus according to claim 4 wherein
    said first indicator is a green light and said second indicator is a red light.

6. Teaching and testing apparatus according to claim 5 including:
    a power source connected to said housing,
    conductor means connecting one side of said power source to one side of said first switch,
    conductor means connecting the other side of said first switch to one side of said green light,
    conductor means connecting the other side of said green light to the other side of said power source,
    conductor means connecting one side of said second switch to said power source,
    conductor means connecting the other side of said second switch to said green light,
    conductor means connecting one side of said power source to one side of said third switch,
    conductor means connecting the other side of said third switch to one side of said red light,
    conductor means connecting the other side of said red light to the other side of said power source,
    conductor means connecting one side of said fourth switch to said power source, and
    conductor means connecting the other side of said fourth switch to said red light.

* * * * *